(12) United States Patent
James

(10) Patent No.: US 11,370,674 B2
(45) Date of Patent: Jun. 28, 2022

(54) APPARATUS FOR THE TREATMENT OF WASTE WATER CONTAINING FATS, OILS AND GREASE

(71) Applicant: PHYSICHEM LTD, Bridgnorth (GB)

(72) Inventor: Thomas Philip James, Shropshire (GB)

(73) Assignee: PYSHICHEM LTD., Bridgnorth (GB)

( * ) Notice: Subject to any disclaimer, the term of this patent is extended or adjusted under 35 U.S.C. 154(b) by 731 days.

(21) Appl. No.: 16/083,002

(22) PCT Filed: Mar. 7, 2017

(86) PCT No.: PCT/GB2017/050607
§ 371 (c)(1),
(2) Date: Sep. 7, 2018

(87) PCT Pub. No.: WO2017/153739
PCT Pub. Date: Sep. 14, 2017

(65) Prior Publication Data
US 2019/0092654 A1 Mar. 28, 2019

(30) Foreign Application Priority Data

Mar. 7, 2016 (GB) ..................................... 1603905

(51) Int. Cl.
*B04B 1/20* (2006.01)
*B04B 5/10* (2006.01)
(Continued)

(52) U.S. Cl.
CPC .......... *C02F 1/385* (2013.01); *B01D 17/0214* (2013.01); *B01D 17/0217* (2013.01);
(Continued)

(58) Field of Classification Search
CPC .... C02F 1/385; C02F 1/38; C02F 1/40; C02F 1/02; C02F 2103/22; C02F 2103/32;
(Continued)

(56) References Cited

U.S. PATENT DOCUMENTS 5,145,585 A * 9/1992 Coke ....................... C02F 1/385
                                                             210/695
5,200,085 A   4/1993 Rudolf et al.
(Continued)

FOREIGN PATENT DOCUMENTS

AU      2013100882      7/2013
DE      102009014108    5/2010
(Continued)

OTHER PUBLICATIONS

International Search Report dated May 15, 2018 for corresponding International Application No. PCT/GB/2017/050607, filed Mar. 7, 2017 (6 pages).
(Continued)

*Primary Examiner* — Charles Cooley
(74) *Attorney, Agent, or Firm* — Daniel F. Nesbitt; Nesbitt IP LLC

(57) ABSTRACT

An apparatus (1) and method for treating contaminated waste water (2). The apparatus comprises a heater (30), a feed apparatus (11, 12, 13, 14), for supplying contaminated waste water (2) to the heater (30) and a centrifuge (50, 60) downstream of the heater (30). A heat exchanger (20) is also provided which has a first channel (22) and a second channel (24). The first channel (22) is connected in a flow path extending between the feed apparatus (11, 12, 13, 14) and
(Continued)

the centrifuge (50, 60); and a waste water outlet (9) from the main centrifuge (60) is fluidly coupled to an inlet of the second channel (24) of the heat exchanger (20).

12 Claims, 7 Drawing Sheets

(51) Int. Cl.
  *B04B 15/02*   (2006.01)
  *C02F 1/38*   (2006.01)
  *C02F 1/40*   (2006.01)
  *B01D 17/02*   (2006.01)
  *B01D 17/12*   (2006.01)
  *B04B 1/08*   (2006.01)
  *C02F 103/22*   (2006.01)
  *C02F 103/32*   (2006.01)
  *C02F 1/02*   (2006.01)

(52) U.S. Cl.
  CPC ............... *B01D 17/12* (2013.01); *B04B 1/08* (2013.01); *B04B 1/20* (2013.01); *B04B 5/10* (2013.01); *B04B 15/02* (2013.01); *C02F 1/38* (2013.01); *C02F 1/40* (2013.01); *C02F 1/02* (2013.01); *C02F 2103/22* (2013.01); *C02F 2103/32* (2013.01)

(58) Field of Classification Search
  CPC ............ B01D 17/0214; B01D 17/0217; B01D 17/12; B04B 1/08; B04B 1/20; B04B 5/10; B04B 15/02
  See application file for complete search history.

(56) References Cited

U.S. PATENT DOCUMENTS

| | | | | |
|---|---|---|---|---|
| 5,593,591 | A * | 1/1997 | Ohsol | C02F 1/06 210/609 |
| 2010/0089835 | A1* | 4/2010 | Lefebvre | B01D 17/042 210/710 |
| 2012/0325739 | A1* | 12/2012 | Denson, Jr. | C02F 1/385 210/614 |
| 2014/0249011 | A1* | 9/2014 | Mense | B04B 5/10 494/13 |
| 2017/0226165 | A1* | 8/2017 | Franko | A23J 1/12 |
| 2019/0092654 | A1* | 3/2019 | James | C02F 1/385 |

FOREIGN PATENT DOCUMENTS

| | | |
|---|---|---|
| FR | 2720014 | 11/1995 |
| FR | 2911514 | 7/2008 |
| JP | 2008188533 | 8/2008 |
| WO | 9723264 | 7/1997 |

OTHER PUBLICATIONS

Written Opinion dated May 15, 2018 for corresponding International Application No. PCT/GB/2017/050607, filed Mar. 7, 2017 (9 pages).

Search Report dated May 31, 2016 for corresponding British Application No. GB1603905.9, filed Mar. 7, 2016 (3 pages).

* cited by examiner

APPARATUS FOR THE TREATMENT OF WASTE WATER CONTAINING FATS, OILS AND GREASE

FIELD OF THE INVENTION

The present invention relates to an apparatus for the treatment of contaminated water waste, and in particular a method for separating fats, oils and greases from waste water. The present invention also relates to a method of treating contaminated water waste.

BACKGROUND OF THE INVENTION

Various processes in the commercial and industrial food sectors lead to the production of waste streams that include a mixture of oils (vegetable oil, animal fats, and/or mineral oils), contaminated water, and solids. In the waste water industry these materials are commonly referred to as 'fats, oils, and grease' (FOG). These FOG waste streams are common to several industries, for example, sink trap grease waste from restaurant kitchens, drainage grease interceptor waste adjacent to animal and food processing facilities, dissolved air flotation sludge produced in dairies, waste water output from tanneries and food processing facilities.

If this type of FOG waste stream gets into drains and sewer networks it can cause major problems since the waste congeals and blocks pipe and sewage network equipment (such as pumping stations) which can then lead to damage, flooding and pollution. It is estimated that blockages account for 80% of the sewer flooding incidents in the UK and a large proportion of these are caused by FOG build-up. In dealing with the problems caused by FOG waste water and sewage, companies must spend large amounts of money on clean-up operations. Once removed from the drain/sewage network, the FOG must be disposed of in accordance with waste management legislation.

The build up of FOG either in parts of the drain and/or sewage network can also cause other environment and/or health risks, for example it may attract vermin and lead to rat infestations.

In an effort to prevent these problems, the water industry has issued guidelines to try to ensure that FOG waste is disposed of correctly and is not disposed of via drains to the sewer network.

Furthermore, in many countries legislation exists with the aim of regulating the disposal of FOG, in particular for businesses. These regulations allow water companies to claim compensation from any business found to have been responsible for blockages caused by FOG.

Food macerators have been proposed, but do not offer a satisfactory solution because the FOG is merely ground into small pieces prior to disposal into the sewage network where it recombines again and causes blockages.

Grease traps or grease interceptors can be installed in drainage systems in both domestic and industrial settings where FOG waste is produced. These collect the FOG and allow the waste water to flow into the sewage network. The traps/interceptors must be maintained and emptied by licenced collectors.

FOG also has a tendency to accumulate in the sewage network, particularly at sewage pumping stations and sewage treatment works. This has often to be extracted with a vacuum tanker and removed.

All the above measures have resulted in large quantities of extracted FOG waste which has to be disposed. Previously this waste product was used as a feed for livestock, spread to land, or fed into anaerobic digesters. However, in many countries due to legislation changes, it must be transported to a waste management site for proper disposal. This can be expensive.

It has been observed that the constituent phases (oil, aqueous and solids) which make up these FOG waste streams are of potential financial value. The oil phase can, for example, be used as a feedstock for the biodiesel industry. The aqueous phase can, for example, be used as a feedstock for low retention time high yield anaerobic digestion. The solids phase can be used, for example, for anaerobic digestion and/or composting, or protein recovery.

Several methods are currently known for the recovery of used cooking oil (UCO) for use as biodiesel for transport fuel or for power generation. However, the existing processes which are used to recover UCO are unsuitable for a commercial FOG extraction process given the past and expected future market values of the separated materials. This is because the high water content commonly found in FOG (as high as 98% on mass basis) leads to a prohibitively large and expensive heating demand in order to achieve the necessary temperature rise to cause separation of the three phases.

So far there has not been a commercially viable proposal put forward for extraction of these phases from FOG waste.

Embodiments of the invention seek to provide an apparatus which overcome some of these problems.

SUMMARY OF INVENTION

According to a first aspect of the present invention there is provided an apparatus for treating contaminated waste water comprising:
 a heater;
 a feed apparatus for supplying contaminated waste water to the heater;
 a centrifuge provided downstream of the heater;
 a heat exchanger having a first channel and a second channel, wherein the first channel is connected in a flow path extending between the feed apparatus and the centrifuge; and
 wherein a waste water outlet from the main centrifuge is fluidly coupled to an inlet of the second channel of the heat exchanger.

The apparatus is particularly suited for the treatment of waste water contaminated with fats, oils and greases (FOG), and solid materials. The apparatus may be suited for the treatment of grease interceptor waste, dissolved air flotation (DAF) sludge, septic tank skimmings, and other similar contaminated waste water streams. Grease interceptor waste may be waste from grease interceptors installed in a drainage system between waste water plumbing and the sewer network, for example, between a commercial sink and the foul water pipe leading to the sewers; or waste from food factories. Dissolved air flotation (DAF) sludge may be waste water from poultry and other animal processing plants, abattoirs, food factories or from petroleum refining processes. Fats, oils and grease may be waste material that has accumulated in the sewer network, for example, at sewage pumping stations, or at sewage treatment works. The feed apparatus may be provided upstream of the heater. The apparatus may comprise a storage tank for holding contaminated waste water, in particular waste water contaminated with fats, oils and greases. The feed apparatus may be a pump. The feed apparatus may be provided between the storage tank and the downstream equipment. The feed apparatus may include additional pumps, provided at other downstream locations.

The channel may be any suitable conduit or flow path, such as a pipe, closed/open channel etc. The first channel of the heat exchanger may be fluidly coupled at a downstream end to the main centrifuge. The first channel of the heat exchanger may be fluidly coupled at an upstream end to the feed apparatus. Further equipment may be provided in the flow path extending between the feed apparatus and the main centrifuge, such that the first channel of the heat exchanger is indirectly coupled to the feed apparatus and/or the main centrifuge.

The main centrifuge may include a plurality of outlets, including at least: a solids discharge flow outlet, a lighter oil stream outlet; and a heavier waste water flow outlet. The waste water outlet of the main centrifuge may be directly or indirectly coupled to the inlet of the second channel of the heat exchanger. The oil stream outlet may be fluidly coupled to a storage tank in order to collect the oil for further processing.

The centrifuge may be a tricanter-type centrifuge.

The apparatus may include a buffer tank provided between the main heater and the tricanter-type centrifuge. The buffer tank may include a stirring mechanism. The buffer tank may include a heating mechanism. The first channel of the heat exchanger may be connected between the buffer tank and the inlet of the tricanter-type centrifuge.

The centrifuge may be a main centrifuge. An auxiliary centrifuge may be provided between the heater and the main centrifuge; the auxiliary centrifuge having a liquid phase outlet which is fluidly coupled to the inlet of the main centrifuge and a solids outlet.

The liquid phase outlet of the auxiliary centrifuge may be directly or indirectly coupled to the inlet of the main centrifuge. The apparatus may include a buffer tank provided between the main heater and the auxiliary centrifuge. The buffer tank may include a stirring mechanism. The buffer tank may include a heating mechanism.

The first channel of the heat exchanger may be provided in a flow path extending between the feed apparatus and the heater. Alternatively, in the case where an auxiliary centrifuge is provided, the first channel of the heat exchanger may be provided in a flow path extending between the auxiliary centrifuge and the main centrifuge.

A secondary heater may be provided between the auxiliary centrifuge and the main centrifuge.

A secondary buffer tank may be provided between the auxiliary centrifuge and the main centrifuge. The secondary buffer tank may supply the secondary heater.

The apparatus may further include a secondary heat exchanger having a first channel and a second channel; wherein the first channel of the secondary heat exchanger is connected in a flow path between the auxiliary centrifuge and the main centrifuge.

The secondary heat exchanger may be provided upstream of a secondary heater. A secondary buffer tank may be provided between the auxiliary centrifuge and the main centrifuge. The secondary buffer tank may supply the secondary heat exchanger.

The second channel of the secondary heat exchanger may be fluidly coupled to the waste water outlet of the main centrifuge.

The waste water exiting the secondary heat exchange may then be conveyed to the second channel of the main heat exchanger. With this arrangement it is possible to further optimise the heat recovery from the waste water.

The second channel of the secondary heat exchanger may be fluidly coupled to the oil phase outlet of the main centrifuge.

The second channel of the secondary heat exchanger may be directly or indirectly coupled to the oil phase outlet of the main centrifuge. With this arrangement, heat is recovered from both the waste water flow and the recovered oil phase flow.

The main centrifuge is a disk-stack-type centrifuge. The auxiliary centrifuge is a decanter-type centrifuge.

The decanter-type centrifuge may include outlets for a solids discharge flow and a liquid phase flow. The disk stack-type centrifuge solids flow outlet may be coupled to the inlet of the decanter-type centrifuge.

The or each heat exchanger may be a counter-flow heat exchanger. The or each heat exchanger may be a parallel-flow heat exchanger. The or each heat exchanger may be a cross-flow heat exchanger. The or each heat exchanger may comprise two heat exchangers arranged in parallel in the flow path.

The main heater and/or the secondary heater is a steam heat exchanger. The main heater and/or secondary heater may be a scraped surface heat exchanger. Polymer or de-emulsifying agents may be added prior to centrifugation.

A macerator may be provided upstream of the heater. The macerator may be configured to reduce the size of any entrained particles in the waste water to below a predefined maximum size. A filter may be provided upstream of the heater, the filter may be configured to remove particles above a predefined size. A metal removal apparatus may be provided upstream of the heater.

According to a further aspect of the present invention, there is provided a method of treating contaminated waste water comprising:

providing a supply of contaminated waste water;
heating the supply in a heater;
separating the contaminated waste water flow by
conveying the heated waste water supply to a centrifuge, configured to separate the flow into a waste water flow; and at least one other flow;
providing a heat exchanger having a first channel and a second channel; conveying the waste water outputted from the centrifuge to the second channel of the heat exchanger; and conveying the supply of waste water through the first channel of the heat exchanger before it is conveyed to the centrifuge.

The method is particularly suited for the treatment of waste water contaminated with fats, oils and greases (FOG).

The centrifuge may be a tricanter centrifuge.

The step of separating the contaminated waste water flow may further include conveying the heated waste water to an auxiliary centrifuge configured to separate the flow into a liquid phase flow and a solids phase flow, and then conveying the liquid phase flow to a main centrifuge configured to separate the flow into a waste water flow; a solids flow and an oil phase flow.

The step of separating the contaminated waste water flow may further include heating the liquid phase flow before it is conveyed to the main centrifuge.

The waste water is pre-heated in the heat exchanger before being conveyed to the main heater.

Alternatively, in the case where the method involves use of an auxiliary centrifuge, the liquid phase flow may be pre-heated in the heat exchanger before being conveyed to the main centrifuge.

The method may further include providing a secondary heat exchanger having a first channel and a second channel;

conveying the oil phase flow outputted from the main centrifuge to the second channel of the secondary heat exchanger; and conveying the liquid phase flow from the auxiliary centrifuge through the first channel of the secondary heat exchanger before it is conveyed to the main centrifuge.

The liquid phase flow may further be heated be a secondary heater before it is conveyed to the main centrifuge.

The main centrifuge may be a disk-stack-type centrifuge and the auxiliary centrifuge may be a decanter-type centrifuge.

The or each heat exchanger may be a counter-flow heat exchanger.

The step of providing a supply of contaminated waste water may include removing particle contaminants above a predefined size and/or metallic particles.

The step of providing a supply of contaminated waste water may include macerating the contaminated waste water supply.

Whilst the invention has been described above, it extends to any inventive combination of features set out above or in the following description or drawings.

BRIEF DESCRIPTION OF THE DRAWINGS

Specific embodiments of the invention will now be described in detail by way of example only and with reference to the accompanying drawings in which.

DESCRIPTION OF AN EMBODIMENT

Figure 1:
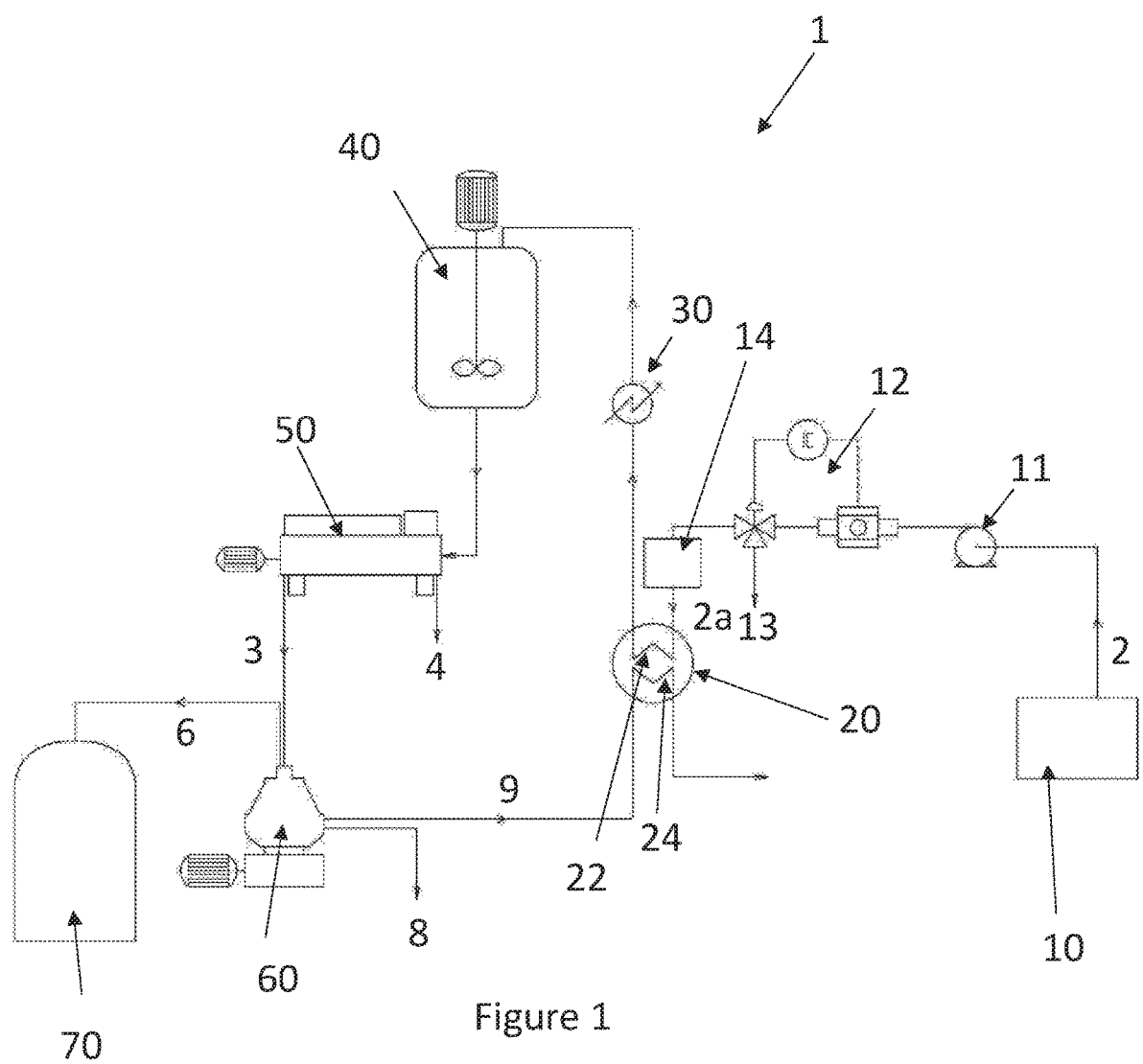
FIG. 1 is a schematic representation of an apparatus according to a first embodiment of the invention.

FIG. 1 shows a plan view of an apparatus 1 for treating waste water according to a first embodiment of the invention. The apparatus 1 provides a cost effective arrangement for extracting contaminants such as fats, oil and grease (FOG) from waste water. The apparatus 1 includes a storage apparatus 10 holding contaminated water 2 including FOG; a pump 11, a metal removal apparatus 12, a macerator 14, a heat exchanger 20, a heater 30, a holding tank 40, a first centrifuge 50, a second centrifuge 60, and an oil storage tank 70. It will be appreciated that the metal removal apparatus 12 and macerator 14 are optional and can be omitted from the apparatus and/or replaced with a filter. It will be appreciated that the metal removal apparatus 12 and macerator 14 may be used in any of the embodiments described herein.

The contaminated waste water is pumped by the pump 11 through the metal removal apparatus 12 which detects and removes metallic particles 13 in order to prevent damage to the downstream equipment.

The waste is then fed through a macerator 14 which reduces the particles to below a predefined maximum size. The maximum size is determined by the maximum permissible particle size which can be handled by the downstream decanter-type centrifuge 50 (explained in more detail below). In a preferred arrangement, a macerator 14 is provided which reduces the average particle size to below the allowable tolerance of the decanting centrifuge, typically below 5 mm, this allows a heat exchanger 20 having a higher heat transfer coefficient to be used. This also ensures that downstream equipment, such as the centrifuges, is not damaged.

The waste water is then fed through a first channel 22 of the heat exchanger 20 (the operation of which will be explained in more detail below) in which the material is preheated. It is then fed to the heater 30, which raises the material temperature to between 50° C. and 98° C. Since the material has been pre-heated by the economiser heat exchanger, less energy is required by the heater in heating the material up to the desired elevated processing temperature.

From the heater 30, in this embodiment the waste water flow is conveyed to the holding tank 40. The holding tank 40 is a stirred tank, and the waste water is continuously stirred at the elevated temperature allowing additional time for the debinding of the material. The material is conveyed from the tank 40 to the first (auxiliary) centrifuge 50. The holding tank may not be necessary in all applications, and when no holding tank is provided the material is conveyed directly from the heat exchanger 20 to the first centrifuge. It will be appreciated that a holding tank 40 may be used in any of the embodiments described herein.

Figure 2A:
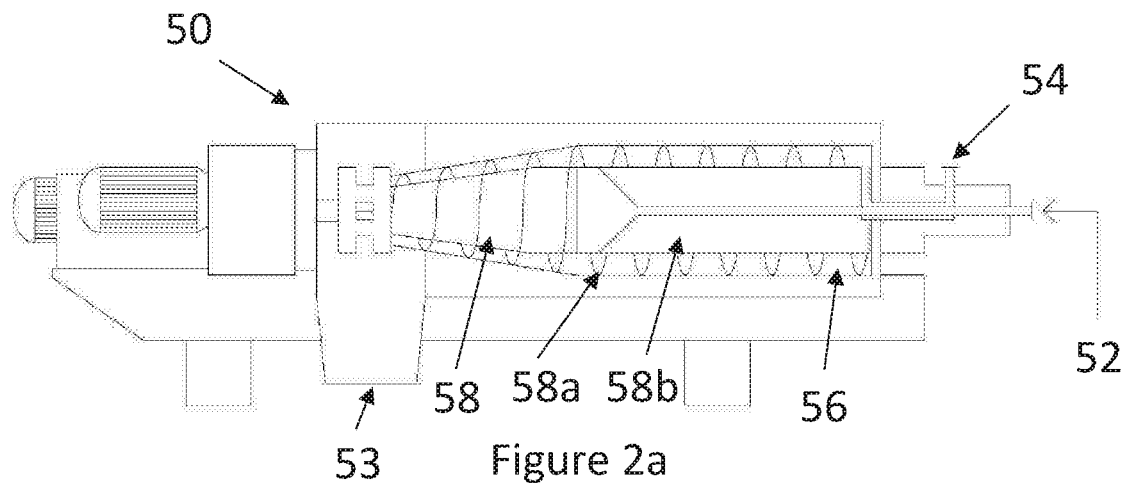
FIGS. 2a to 2c show schematic views of types of centrifuges used in embodiments of the invention.

The first centrifuge 50 is a decanter-type centrifuge. The first centrifuge 50 separates the material into low moisture content solid flow 4 and a liquid phase flow 3 having a low solids content. A typical decanter-type centrifuge (shown in FIG. 2a) includes a horizontal spinning bowl 56, and an auger type screw 58, comprising a helical blade 58a mounted on a shaft 58b which provided within the bowl 56 such that there is a small clearance between the distal extremes of the screw blade 58a and the surface of the bowl 56. The centrifuge 50 includes an inlet 52, a first outlet 53 at a first end of the bowl, and a second outlet 54 at the opposite end of the bowl. Inflow material is fed from the inlet 52 through the shaft 58b into the bowl 56 which rotates at approximately 3000 rpm. The screw 58 is rotated at a slightly lower speed to that of the bowl 56, typically a differential in the range 15-100 rpm. This causes the screw 58 to convey the solids away from the lighter liquid phases. Thus, the solids are discharged from the first outlet 53 and the liquid phases flow is discharged from the second outlet 54. It has been found that the solids are discharged with moisture content typically in the range 10-20%, and the liquid phases are discharged with very low solids content. The decanter-type centrifuge 50 has an operating temperature of approximately 60° C.

Figure 2B:
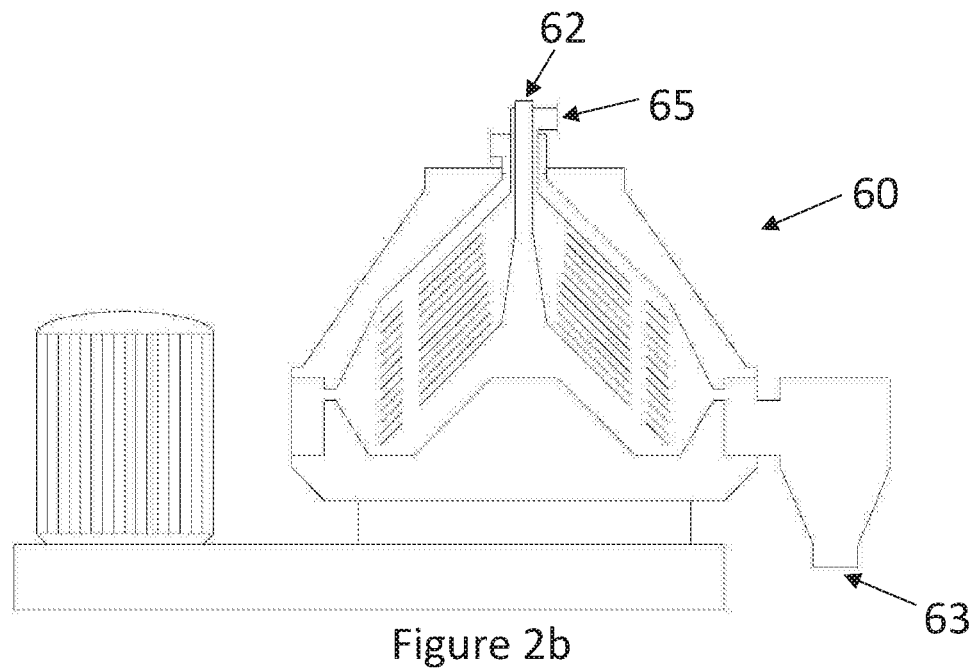

The liquid phases 3 are then conveyed to a second, main centrifuge 60. The second centrifuge 60 is a disk stack type centrifuge or separator, also known as a conical plate centrifuge. The disk stack type centrifuge 60 separates the material outputted from the first centrifuge into: a solids discharge flow 8, a lighter oil stream 6 and a heavier waste water flow 9. A typical disk stack type centrifuge separates the phases by subjecting the liquid phases to an extremely high centrifugal force, and includes stack plates which provide increased surface settling area to speed up the separation process. A typical disk stack type centrifuge is shown in FIG. 2b. The disk stack centrifuge 60 includes an inlet 62, a first outlet 63 through which the solids discharge flow is discharged, a second outlet 64 for discharging the heavy water 9 and a third outlet 65 for discharging the lighter oil 6. The oil stream 6 has a water content brought down to solubility levels (<1 weight percentage (wt %)) and with almost all trace solids removed. The waste water flow 9 has a raised temperature, typically in the range 80 to 98° C. and is conveyed to a second channel 24 of the heat exchanger 20. The heat exchanger 20 of the embodiment has a counter-current arrangement in which the water waste inlet is provided at the same end as the material flow outlet. It will be appreciated that other heat exchangers having other flow arrangements (parallel-flow or cross-flow) may also be used. As indicated above, the heat recovered from the waste water heats up the material flowing through the first channel 22, which reduces the heating requirement and therefore energy consumption of the heater 30. The waste water exiting from the apparatus 1 has been cooled sufficiently to be discharged into the sewage network.

Figure 2C:
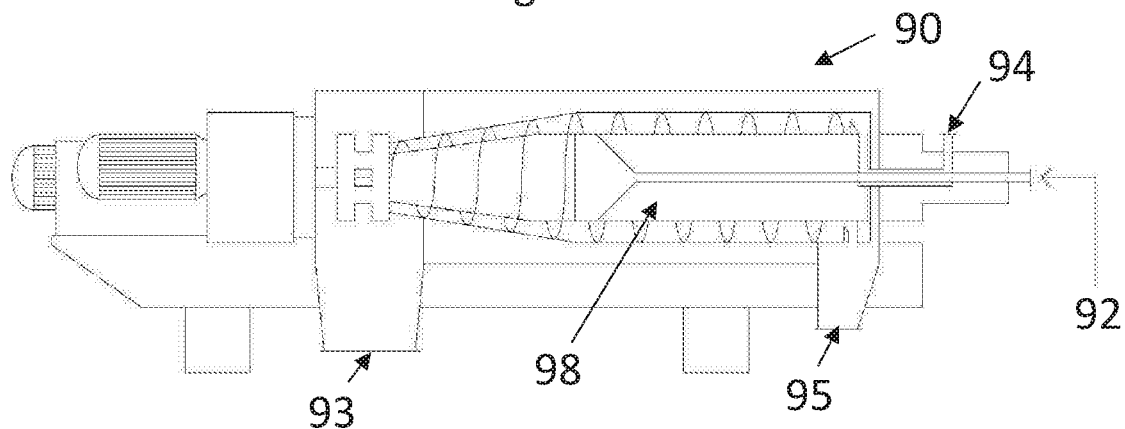

In another embodiment (not shown), the apparatus includes a single tricanter-type centrifuge 90 (shown in FIG. 2C) instead of the first and second centrifuges as described above. When the tricanter-type centrifuge is used, the material is transferred from the stirring tank into the centrifuge inlet 92. The solids are conveyed by a screw 98 away from the liquid phases, and then discharged from a first outlet 94. The heavier water waste flow is discharged under pressure from a second outlet 93 and conveyed to the second channel of the heat exchange in the same way as described above for the water waste from the second centrifuge in FIG. 1. The lighter oil stream is discharged by gravity through a third outlet 95.

Figure 3:
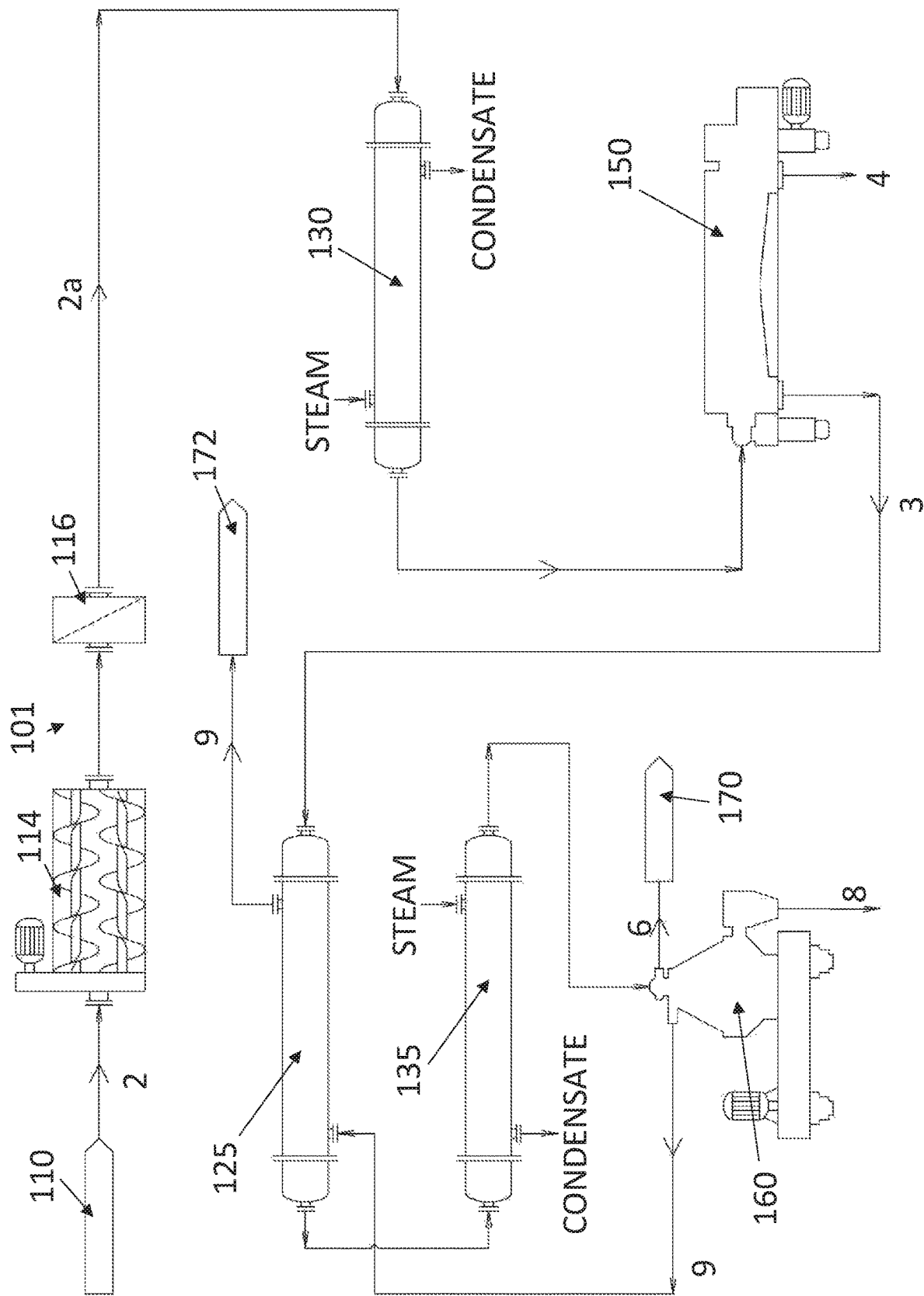
FIGS. 3 to 7 are schematic representations of an apparatus according to further embodiments of the invention.

FIG. 3 shows an apparatus 101 according to second embodiment of the invention. This arrangement utilises the same principle of heat recovery as the first embodiment. The apparatus 101 includes a includes a storage tank 110 holding contaminated water 2 including FOG; a pump (not shown), a macerator 114, a filter 116, a heat exchanger 125, a first heater 130, a first centrifuge 150, a second heater 135, a second centrifuge 160, and an oil storage tank 170. As with the above embodiment, the filter 116 and macerator 114 are optional and can be omitted from the apparatus. It will be appreciated that the filter 116 and macerator 114 may be used in any of the embodiments described herein. The arrangement may also include a metal detection/removal apparatus.

In this arrangement a pump (not shown) pumps the contaminated waste water through the macerator and filter to reduce entrained particle size and remove large contaminants to ensure that subsequent downstream equipment, such as the centrifuges, is not damaged. The processed waste water flow 2a then passes first through the first heater 130 which raises the temperature to approximately 95 C. and then into the first (auxiliary) centrifuge 150. As in the previous embodiment, this is a decanter-type centrifuge which separates the contaminated waste water into a low moisture content solid flow 4 and a liquid phase flow 3 having a low solids content. The liquid phase flow 3 is then conveyed through a first channel of the heat exchanger 125, through a second heater 135 and then to the second, main centrifuge 160. The second centrifuge is a disk stack centrifuge (as before), which separates the flow into: a solids discharge flow 8, a lighter oil stream 6 and a heavier waste water flow 9. The waste water flow 9 is conveyed to a second channel of the heat exchanger 125. The cooled waste water exiting the heat exchanger 125 is then collected in a tank 172, from where it can be discharged into the sewage network.

Figure 4:
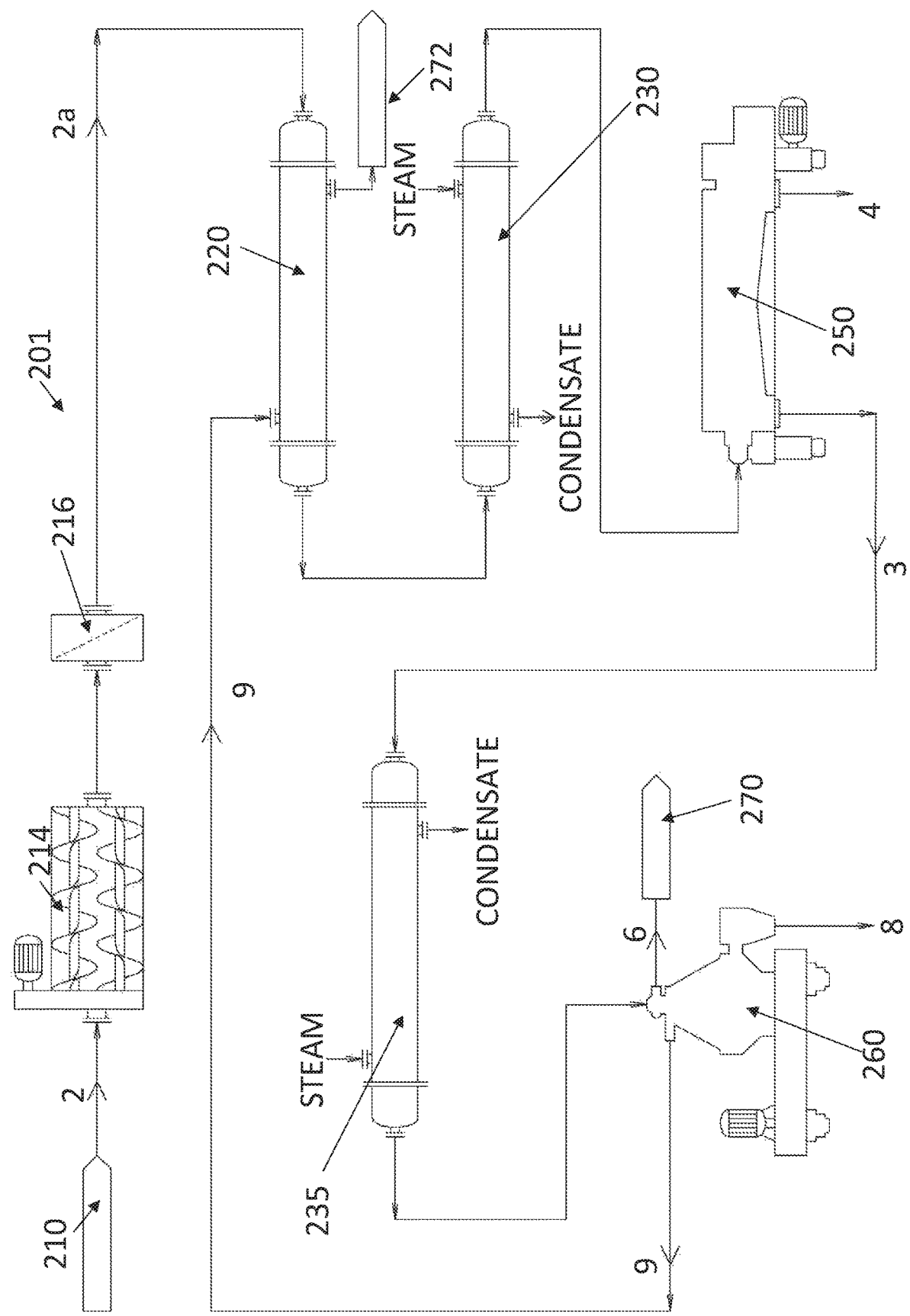

FIG. 4 shows an apparatus 201 according to third embodiment of the invention. The apparatus 201 includes a includes a storage tank 210 holding contaminated water 2 including FOG; a pump (not shown), a macerator 214, a filter 216, a heat exchanger 220, a first heater 230, a first centrifuge 250, a second heater 235, a second centrifuge 260, and an oil storage tank 270. As above, the filter 216 and macerator 214 are optional and can be omitted from the apparatus. It will be appreciated that the filter 216 and macerator 214 may be used in any of the embodiments described herein. The arrangement may also include a metal detection/removal apparatus. The first centrifuge 250 is a decanter type centrifuge and the second centrifuge 260 is a disk-stack type centrifuge.

In the apparatus 201, as before, a pump (not shown) pumps the contaminated waste water through the macerator and filter to reduce entrained particle size and remove large contaminants. In this arrangement, the processed waste water flow 2a passes first through a first channel of the heat exchanger 220 and then through a heater 230. The heated waste water flow is then conveyed into the decanter centrifuge 250 where is separated into a low moisture content solid flow 4 and a liquid phase flow 3. This arrangement differs from previous embodiments in that the liquid phase flow 3 exiting the decanter centrifuge 250 is conveyed through the second heater 235 before entering the disk stack centrifuge 260. The second heater 235 raises the temperature of the liquid phase flow to approximately 95° C. which will allow a greater degree of separation between heavy and light liquid phases at a given flowrate.

As before, the disk stack centrifuge separates the flow into: a solids discharge flow 8, a lighter oil stream 6 and a heavier waste water flow 9. The waste water flow 9 is conveyed through a second channel of the heat exchanger 220. The cooled waste water exiting the heat exchanger 220 is then collected in a tank 272, from where it can be discharged into the sewage network.

Figure 5:
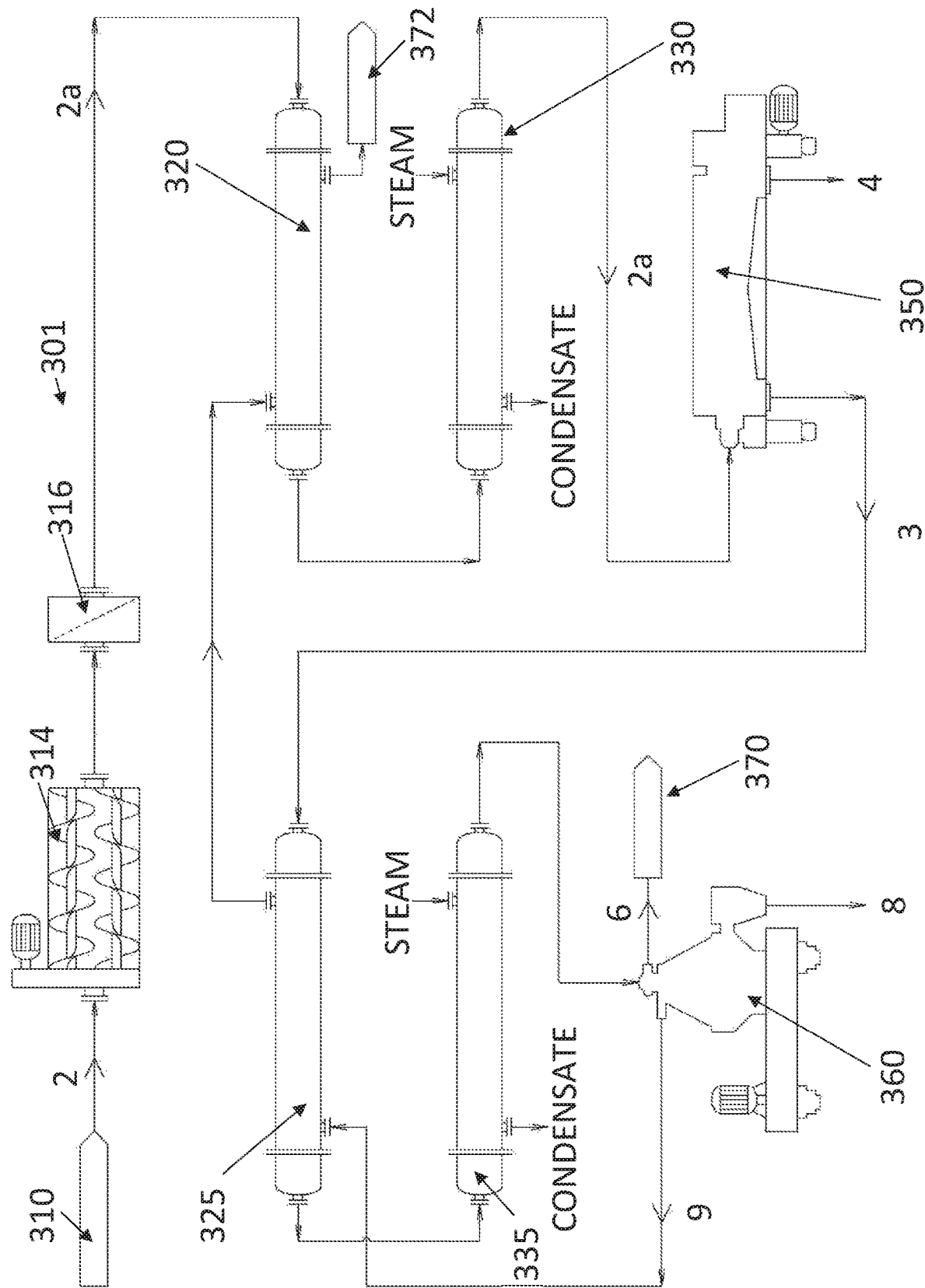

FIG. 5 shows an apparatus 301 according to fourth embodiment of the invention. The apparatus 301 includes a includes a storage tank 310 holding contaminated water 2 including FOG; a pump (not shown), a macerator 314, a filter 316, a first heat exchanger 320, a first heater 330, a first centrifuge 350, a second heat exchanger 325, a second heater 335, a second centrifuge 360, and an oil storage tank 370. As above, the filter 316 and macerator 314 are optional and can be omitted from the apparatus, and a metal detection/removal apparatus may also be included upstream of the first heat exchanger 320. It will be appreciated that the filter 316 and macerator 314 may be used in any of the embodiments described herein. The first centrifuge 350 is a decanter type centrifuge and the second centrifuge 360 is a disk-stack type centrifuge.

In this arrangement, the processed waste water flow 2a passes through a first channel in the first heat exchanger 320 and then the first heater 330 before being conveyed into the decanter centrifuge 350. The liquid phase outflow 3 from the decanter centrifuge 350 is passed through a first channel of the second heat exchanger 325 which preheats it before it enters the second heater 335. The second heater 335 heats the flow to a temperature of approximately 95° C. which allows for a greater degree of separation between the heavy and light liquid phases.

The disk stack centrifuge 360 separates the flow into: a solids discharge flow 8, a lighter oil stream 6 and a heavier waste water flow 9. The waste water flow 9 is conveyed first through a second channel of the second heat exchanger 325, and then through a second channel of the first heat exchanger 320. The cooled waste water exiting the first heat exchanger 320 is then collected in a tank 372, from where it can be discharged into the sewage network.

This embodiment provides liquid inflow to the disk stack centrifuge with an elevated temperature which is typically in the range of 80 to 98° C. However, the double heat recovery from the waste water flow reduces the energy required by the two heaters 330, 335.

In another embodiment (not show in the figures), an apparatus is provided which is similar to that shown in FIG.

5, but without the second heater, meaning that the liquid phase flow is heated only by the second heat exchanger before being conveyed into the disk stack centrifuge. Since this arrangement includes only one heater it has a lower energy requirement.

Figure 6:
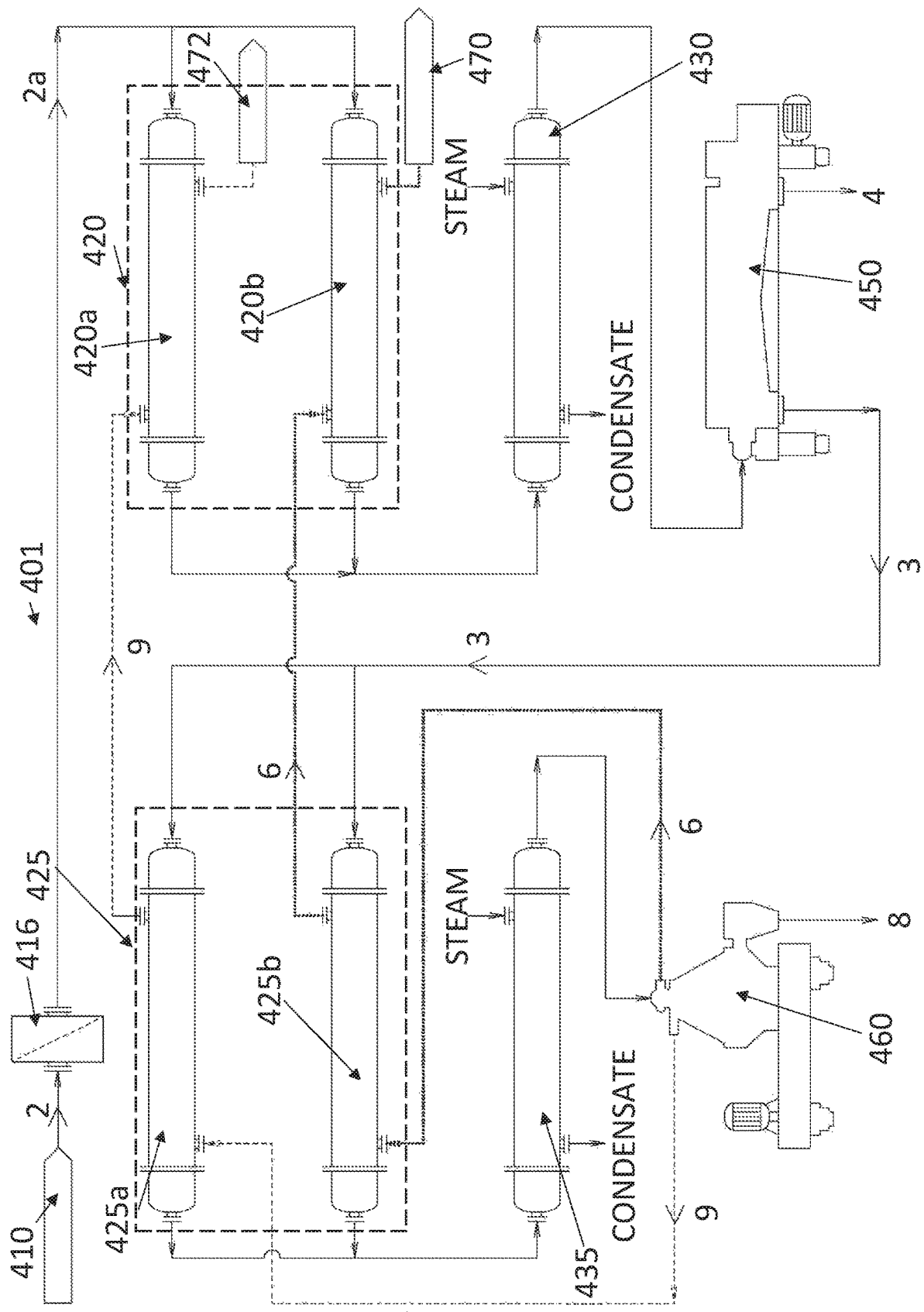

FIG. 6 shows an apparatus 401 according to fifth embodiment of the invention. The apparatus 401 includes a storage tank 410 holding contaminated water 2 including FOG; a pump (not shown), a filter 416, a first heat exchanger 420, a first heater 430, a first centrifuge 450, a second heat exchanger 425, a second heater 435, a second centrifuge 460, and an oil storage tank 470. As above, the filter 416 is optional, and the macerator and/or a metal detection/removal apparatus may also be included upstream of the first heat exchanger. It will be appreciated that the filter 416 and the macerator may be used in any of the embodiments described herein. The first centrifuge 450 is a decanter type centrifuge and the second centrifuge 460 is a disk-stack type centrifuge.

In this embodiment, the first heat exchanger 420 includes two heat exchangers 420a, 420b arranged in parallel, downstream of the first heater 430 in the flow path. The processed waste water flow 2a is split into two channels and conveyed through first channels in the two heat exchangers 420a, 420b. As before, after the first heat exchanger 420 the processed waste water flow 2a is conveyed to the first heater 430. Similarly, the second heat exchanger 425 includes two heat exchangers 425a, 425b arranged in parallel in the liquid phase 3 flow path between the decanter centrifuge 450 and the second heater 435.

The disk stack centrifuge 460 separates the flow into: a solids discharge flow 8, a lighter oil stream 6 and a heavier waste water flow 9. The waste water flow 9 is conveyed first through a second channel of the second heat exchanger 425a, and then through a second channel of the first heat exchanger 420a. The oil stream flow 6 is conveyed first through a second channel of the second heat exchanger 425b, and then through a second channel of the first heat exchanger 420b. This means that heat is recovered from both the extracted oil and waste water. The double parallel heat exchanger arrangements produce a greater temperature rise, which results in lower energy requirements for both of the heaters 430, 435.

In a further embodiment (not shown) an apparatus is provided which is similar to that shown in FIG. 6, but without the second heater.

Figure 7:
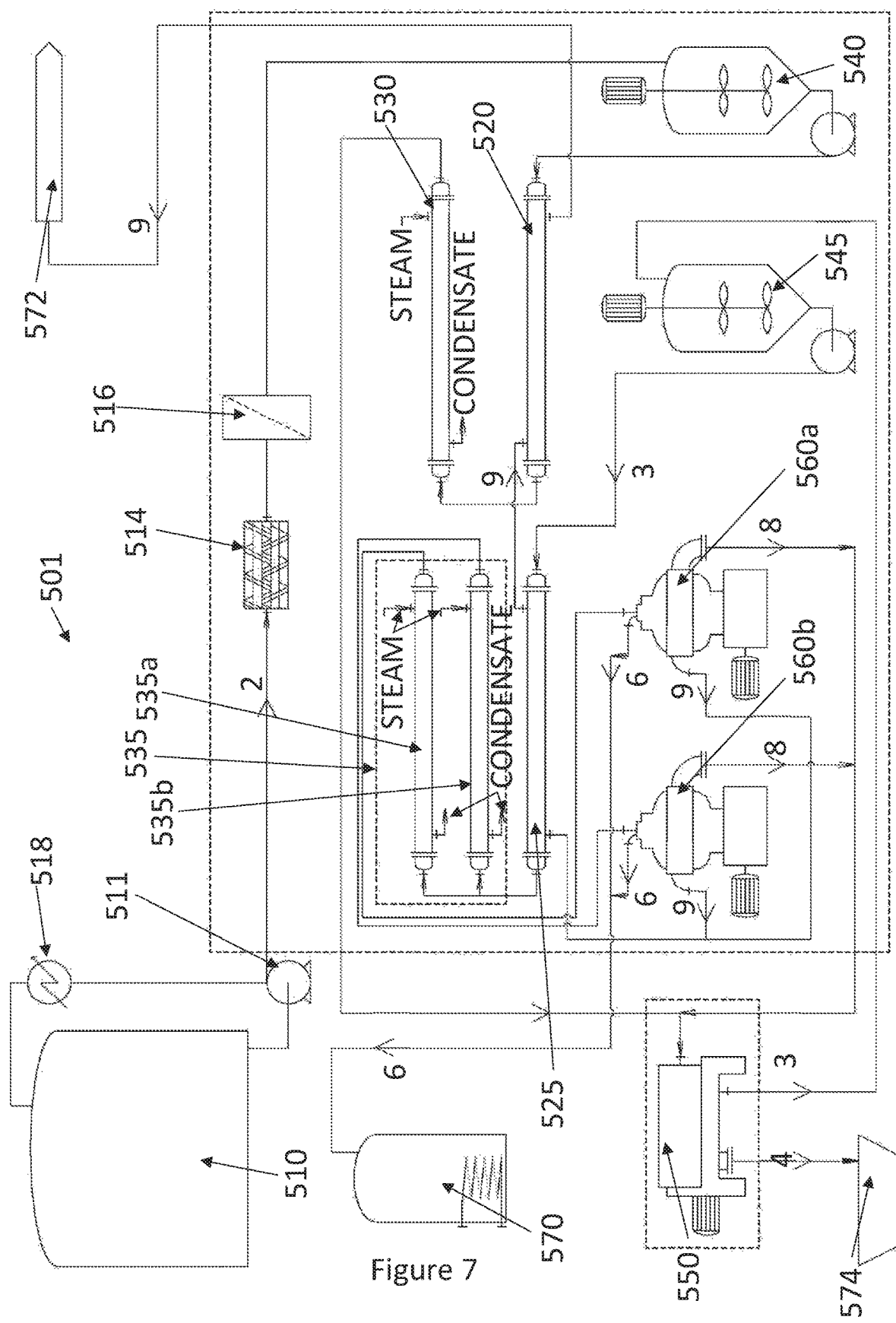

FIG. 7 shows an apparatus 501 according to a further embodiment of the invention. The apparatus 501 includes a storage tank 510 holding contaminated water 2 including FOG; a pump (not shown), a macerator 514, a filter 516, a first holding tank, a first heat exchanger 520, a first heater 530, a first centrifuge 550, a second holding tank 545, a second heat exchanger 525 a second heater 535, two second centrifuges 560a and 560b, an oil storage tank 570 and a waste water tank 572. As above, the filter 516 and macerator are optional, and/or a metal detection/removal apparatus may also be included upstream of the first heat exchanger. It will be appreciated that the filter 516 and macerator may be used in any of the embodiments described herein. The first centrifuge 550 is a decanter type centrifuge and the second centrifuges 560a and 560b are disk-stack type centrifuges.

The apparatus 501 is an example layout of the type suited for large-scale operations which can process large quantities of FOG contaminated waste water, such as in a water utilities company.

In the embodiment shown, the storage tank includes a loop circuit having a hot water heater 518. The feedstock stored in the tank 510 can be pumped by the pump 511 around this circuit to recirculate and heat the feedstock. This storage loop circuit may be provided in combination with the other apparatus layouts described previously.

The processed waste water flow 2a is conveyed through the first holding tank 540 in which it is stirred, and from here conveyed to the first heat exchanger 520 and then to the first heater 530. The heated flow is then conveyed to the decanter centrifuge where it is separated into a solids flow 4 and a liquids phase flow 3. The liquids phase flow 3 is conveyed to the second holding (stirring) tank 545 and then to the second heat exchanger 525. It will be appreciated that holding tanks 540 and 545 may be used in any of the embodiments described herein.

The second heater 535 includes two heaters 535a, 555b arranged in parallel upstream of the second heat exchanger 525. After being pre-heated in the second heat exchanger 525, the flow is split into two and conveyed through the two heaters 535a, 535b. Each of the heaters 535a, 555b feeds a respective disk stack centrifuge 560a, 560b. The oil phase outflows 6 from the disk stack centrifuges are conveyed to an oil storage tank 570. The waste water flows 9 from the disk stack centrifuges 560a, 560b are combined to a single channel and conveyed first through a second channel of the second heat exchanger 525, and then through a second channel of the first heat exchanger 520.

It will be appreciated that single heat exchangers may be provided in the arrangement of FIG. 7 and that the oil phase flow may be conveyed through one heat exchanger and the water phase flow may be conveyed through the second heat exchanger. While the invention has been described above with reference to one or more preferred embodiments, it will be appreciated that various changes or modifications may be made without departing from the scope of the invention as defined in the appended claims.

The invention claimed is:

1. An apparatus for treating contaminated waste water comprising:
   a heater;
   a feed apparatus for supplying contaminated waste water to the heater;
   a main centrifuge provided downstream of the heater;
   an auxiliary centrifuge provided between the heater and the main centrifuge; the auxiliary centrifuge having a liquid phase outlet that is fluidly coupled to the inlet of the main centrifuge and a solids outlet;
   a heat exchanger having a first channel and a second channel, wherein the first channel is connected in a flow path extending between the feed apparatus and the main centrifuge; and
   wherein a waste water outlet from the main centrifuge is fluidly coupled to an inlet of the second channel of the heat exchanger.

2. The apparatus according to claim 1, wherein the first channel of the heat exchanger is provided in a flow path extending between the feed apparatus and the heater.

3. An apparatus according to claim 1, wherein a secondary heater is provided between the auxiliary centrifuge and the main centrifuge.

4. An apparatus according to claim 1, wherein the heater is a main heater, and at least one of the main heater and the secondary heater is a steam heat exchanger.

5. An apparatus according to claim 1, wherein the apparatus further includes a secondary heat exchanger having a first channel and a second channel; and wherein the first channel of the secondary heat exchanger is connected in a flow path between the auxiliary centrifuge and the main centrifuge.

6. An apparatus according to claim 5, wherein the second channel of the secondary heat exchanger is fluidly coupled to the waste water outlet of the main centrifuge.

7. An apparatus according to claim 1, wherein the main centrifuge is a disk-stack-type centrifuge and the auxiliary centrifuge is a decanter-type centrifuge.

8. An apparatus according to claim 1, wherein the or each heat exchanger is a counter-flow heat exchanger.

9. An apparatus according to claim 1, wherein a macerator is provided upstream of the heater.

10. A method of treating contaminated waste water comprising:
   providing a supply flow of contaminated waste water;
   heating the supply flow of contaminated waste water in a heater;
   separating the supply flow of contaminated waste water by
      conveying the heated supply flow of contaminated waste water to an auxiliary centrifuge configured to separate the supply flow into a heated liquid phase flow and a solids phase flow, and
      conveying the heated liquid phase flow to a main centrifuge configured to separate the heated liquid phase flow into an output waste water flow, a solids flow, and an oil phase flow;
   providing a heat exchanger having a first channel and a second channel;
   conveying the output waste water flow to the second channel of the heat exchanger; and
   conveying the supply flow of contaminated waste water through the first channel of the heat exchanger before it is conveyed to the main centrifuge.

11. A method according to claim 10, wherein the supply flow of contaminated waste water through the first channel of the heat exchanger is pre-heated in the heat exchanger before being conveyed to the heater.

12. A method according to claim 10, wherein the step of providing a supply flow of contaminated waste water includes removing particle contaminants above a predefined size and/or metallic particles from the supply flow of contaminated waste water.

* * * * *

UNITED STATES PATENT AND TRADEMARK OFFICE
CERTIFICATE OF CORRECTION

PATENT NO. : 11,370,674 B2
APPLICATION NO. : 16/083002
DATED : June 28, 2022
INVENTOR(S) : Thomas Philip James It is certified that error appears in the above-identified patent and that said Letters Patent is hereby corrected as shown below:

In the Claims

Claim 4, Column 10, Line 62, delete "claim 1" and insert --claim 3--.

Signed and Sealed this
Sixth Day of September, 2022

Katherine Kelly Vidal
*Director of the United States Patent and Trademark Office*